United States Patent
Bae

(10) Patent No.: US 9,356,999 B2
(45) Date of Patent: May 31, 2016

(54) SYSTEM AND METHOD FOR CHANGING CHANNELS FOR GUARANTEED RELIABILITY COMMUNICATIONS

(75) Inventor: Hyun-Jik Bae, Seoul (KR)

(73) Assignee: NETTENTION INC., Seoul (KR)

( * ) Notice: Subject to any disclaimer, the term of this patent is extended or adjusted under 35 U.S.C. 154(b) by 788 days.

(21) Appl. No.: 13/030,244

(22) Filed: Feb. 18, 2011

(65) Prior Publication Data

US 2012/0023248 A1    Jan. 26, 2012

(30) Foreign Application Priority Data

Jul. 26, 2010 (KR) .......................... 10-2010-0071746

(51) Int. Cl.
*G06F 15/16* (2006.01)
*H04L 29/08* (2006.01)

(52) U.S. Cl.
CPC .............. *H04L 67/104* (2013.01); *H04L 67/06* (2013.01); *H04Q 2213/13389* (2013.01)

(58) Field of Classification Search
CPC .............................. H04L 67/104; H04L 67/06
USPC ......................................................... 709/230
See application file for complete search history.

(56) References Cited

U.S. PATENT DOCUMENTS

| | | | |
|---|---|---|---|
| 6,412,006 B2 * | 6/2002 | Naudus ........................ | 709/227 |
| 6,546,425 B1 * | 4/2003 | Hanson et al. ................ | 709/227 |
| 6,981,047 B2 * | 12/2005 | Hanson et al. ................ | 709/227 |
| 7,136,645 B2 * | 11/2006 | Hanson et al. ............ | 455/435.1 |
| 7,171,485 B2 * | 1/2007 | Roach et al. .................. | 709/232 |
| 7,293,107 B1 * | 11/2007 | Hanson et al. ................ | 709/245 |
| 7,574,208 B2 * | 8/2009 | Hanson et al. ............ | 455/435.1 |
| 7,644,171 B2 * | 1/2010 | Sturniolo et al. ............. | 709/230 |
| 7,778,260 B2 * | 8/2010 | Sturniolo et al. ............. | 370/401 |
| 8,060,656 B2 * | 11/2011 | Hanson et al. ................ | 709/250 |
| 8,078,727 B2 * | 12/2011 | Hanson et al. ................ | 709/226 |
| 2002/0016837 A1 * | 2/2002 | Naudus ........................ | 709/224 |
| 2002/0098840 A1 * | 7/2002 | Hanson et al. ................ | 455/435 |
| 2003/0120811 A1 * | 6/2003 | Hanson et al. ................ | 709/245 |
| 2003/0177187 A1 * | 9/2003 | Levine et al. ................. | 709/205 |
| 2004/0111523 A1 * | 6/2004 | Hall et al. ..................... | 709/230 |
| 2005/0223114 A1 * | 10/2005 | Hanson et al. ................ | 709/245 |
| 2005/0223115 A1 * | 10/2005 | Hanson et al. ................ | 709/245 |
| 2006/0009213 A1 * | 1/2006 | Sturniolo et al. .......... | 455/426.1 |
| 2006/0123079 A1 * | 6/2006 | Sturniolo et al. ............. | 709/203 |
| 2007/0038759 A1 * | 2/2007 | Hanson et al. ................ | 709/227 |
| 2007/0265000 A1 * | 11/2007 | Hanson et al. ............ | 455/432.1 |
| 2010/0232429 A1 * | 9/2010 | Rao et al. ...................... | 370/389 |
| 2012/0023248 A1 * | 1/2012 | Bae .............................. | 709/230 |
| 2012/0179819 A1 * | 7/2012 | Hanson et al. ................ | 709/225 |

\* cited by examiner

*Primary Examiner* — Hua Fan
(74) *Attorney, Agent, or Firm* — Paratus Law Group, PLLC

(57) ABSTRACT

A system and method for changing communication channels is provided. In the system, a transmitting peer divides transmission data into frames to generate an unfinished frame list and transmits a data frame to a receiving terminal according to the unfinished frame list and a receiving peer receives a data frame from the transmitting peer and transmits a response frame to the transmitting peer in response to the received data frame during direct channel communication. The transmitting peer transmits incompletely transmitted data frames (whose response frames have not been received) included in the unfinished frame list to the receiving peer through a relay server when a communication scheme has been changed from the direct channel communication scheme to a relay channel communication scheme. When the communication scheme is changed as circumstances require, specifically, from the direct scheme to the relay scheme, it is possible to rapidly change the communication channel without interruption of data communication.

6 Claims, 2 Drawing Sheets

SYSTEM AND METHOD FOR CHANGING CHANNELS FOR GUARANTEED RELIABILITY COMMUNICATIONS

CROSS REFERENCE TO PRIOR APPLICATIONS

The present application claims priority under 35 U.S.C. §119 to Korean Patent Application No. 10-2010-0071746 (filed on Jul. 26, 2010), which is hereby incorporated by reference in its entirety.

BACKGROUND OF THE INVENTION

1. Field of the Invention

The present invention relates to a system and method for changing communication channels, and more particularly to a system and method for changing communication channels which enables reliable data communication without communication interruption when a communication channel is changed to a direct channel or a relay channel according to a channel setting environment.

2. Description of the Related Art

Transmission of data from one terminal to another is performed using two main methods, one using a relay channel, the other using a direct channel.

In the relay channel communication method, a terminal which desires to transmit data (hereinafter, referred to as a "transmitting peer") divides transmission data into a number of frames and sequentially transmits the frames to a relay server. The relay server then transmits the transmitted frames to a terminal which desires to receive data (hereinafter, referred to as a "receiving peer").

On the other hand, in the relay channel communication method, a transmitting peer directly transmits frames produced through division of the transmission data to a receiving peer without passing through a relay server and thus the method is generally referred to as "Peer to Peer (P2P)".

The direct channel communication method is considered an efficient communication method since it enables high data transmission speed while imposing little load on the relay server. However, the direct channel communication method cannot perform data communication when access to the receiving peer is not permitted due to firewall, Network Address Translator (NAT), or the like.

In one conventional method for overcoming this problem, the transmitting peer performs data communication with the receiving peer through a direct channel communication scheme when direct channel communication is possible between the transmitting peer and the receiving peer and performs data communication with the receiving peer through a relay channel communication scheme when direct channel communication is not possible (see Korean Registered Patent No. 0703065).

However, this conventional method has the following problems.

Data communication is performed after a communication channel is established. Therefore, when direct channel communication becomes impossible while data communication is being performed through the direct channel communication scheme, a communication channel should be reestablished to resume data communication, thereby reducing data communication continuity.

In the case where the conventional guaranteed reliability protocol is used, a list of frames that have not been successfully transmitted is newly generated and used for communication when a communication scheme has been changed. This increases data transmission time and reduces data transmission reliability.

SUMMARY OF THE INVENTION

Therefore, the present invention has been made in view of the above problems, and it is an object of the present invention to provide a system and method for changing channels for guaranteed reliability communication which allows a communication channel to be rapidly changed without interruption of data communication when a communication scheme is changed as circumstances require.

It is another object of the present invention to provide a system and method for changing channels for guaranteed reliability communication which allows data transmission reliability to be maintained while changing the communication scheme without interruption of data communication.

In accordance with an aspect of the present invention, the above and other objects can be accomplished by the provision of a system for changing channels for guaranteed reliability communication, the system including a relay server for relaying communication of a relay channel between connected terminals, a transmitting peer for dividing data to be transmitted into frames to generate an unfinished frame list and transmitting a data frame to a data destination terminal according to the unfinished frame list, and a receiving peer for receiving a data frame from the transmitting peer and transmitting a response frame to the transmitting peer in response to the received data frame during direct channel communication, wherein the transmitting peer transmits incompletely transmitted data frames included in the unfinished frame list generated during the direct channel communication to the receiving peer through the relay server when a communication scheme has been changed from the direct channel communication scheme to a relay channel communication scheme, and wherein the incompletely transmitted data frames are data frames whose response frames have not been received by the transmitting peer after being transmitted from the transmitting peer to the receiving peer.

Here, transmission of the incompletely transmitted data frames from the transmitting peer is performed immediately, regardless of a preset time for data retransmission, when the communication scheme has been changed from the direct channel communication scheme to the relay channel communication scheme.

In addition, the transmitting peer and the receiving peer perform data communication using a User Datagram Protocol (UDP) during direct channel communication.

Further, the transmitting peer and the receiving peer perform data communication using a Transmission Control Protocol (TCP) during relay channel communication.

In accordance with another aspect of the present invention, there is provided a method for changing channels for guaranteed reliability communication in a system including a transmitting peer, a receiving peer, and a relay server, wherein a communication scheme is changed according to whether or not direct channel communication is possible between the transmitting peer and the receiving peer that are connected, the method including dividing, by the transmitting peer, data to be transmitted into frames to generate an unfinished frame list, establishing, by the transmitting peer, direct channel communication with the receiving peer and transmitting a data frame to the receiving peer according to the unfinished frame list, transmitting, by the receiving peer, a response frame to the transmitting peer in response to a received data frame, updating, by the transmitting peer, the unfinished frame list according to the response frame at time intervals of a preset period, and transmitting, by the transmitting peer, incompletely transmitted data frames included in the updated unfinished frame list to the receiving peer through the relay server when direct channel communication between the transmitting peer and the receiving peer is not possible, wherein the incompletely transmitted data frames are data frames whose response frames have not been received by the transmitting peer after being transmitted from the transmitting peer to the receiving peer.

The system and method for changing channels for guaranteed reliability communication according to the present invention has a variety advantages.

For example, when the communication scheme is changed as circumstances require, specifically, when the communication scheme is changed from a direct channel communication scheme to a relay channel communication scheme, it is possible to rapidly change the communication channel without interruption of data communication.

In addition, it is possible to maintain data transmission reliability while changing the communication scheme without interruption of data communication.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Data communication protocols are classified into a guaranteed reliability protocol and an unguaranteed reliability protocol according to whether or not reliability of transmission data is guaranteed.

The guaranteed reliability protocol allows a transmission frame, which has not been successfully transmitted due to communication failure or due to loss of the frame during transmission, to be retransmitted using a response frame in response to the transmission frame. According to the guaranteed reliability protocol, received frames are rearranged by checking the order of the frames and then a frame lost during transmission is determined and the lost frame is received again, thereby receiving complete data. One typical example of the guaranteed reliability protocol is a Transmission Control Protocol (TCP).

According to the unguaranteed reliability protocol, data is transmitted unidirectionally without guaranteeing reliability of transmission of the data, similar to broadcasting. One typical example of the unguaranteed reliability protocol is a User Datagram Protocol (UDP).

The present invention provides a method for changing channels, wherein reliability of data transmission is guaranteed while data communication is continuously performed without interruption when an established communication channel is changed.

In the following description, "change of a communication scheme" is used to indicate change of the communication scheme between a direct channel communication scheme and a relay channel communication scheme.

Figure 1:
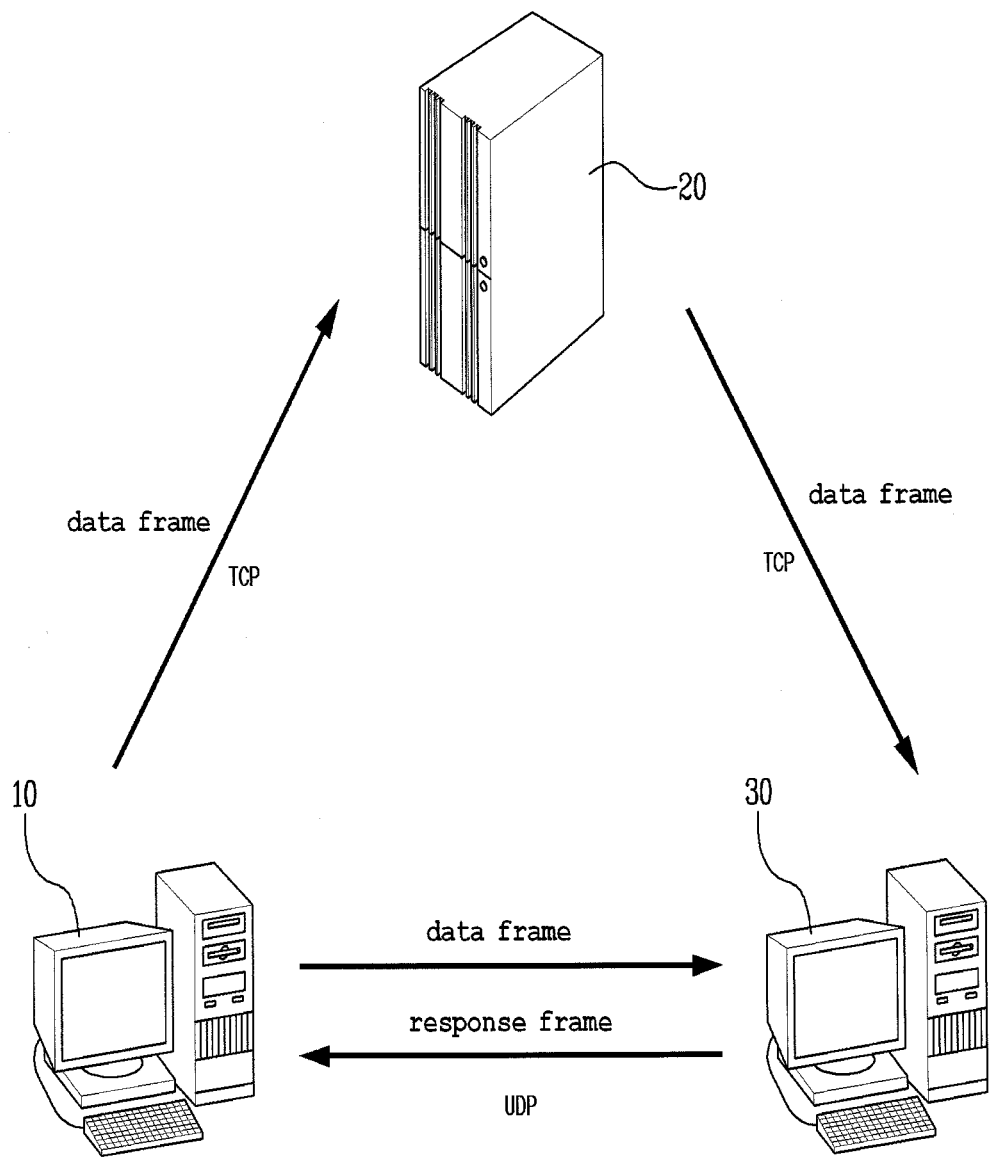
FIG. 1 is a block diagram illustrating a specific embodiment of a system for changing channels for guaranteed reliability communication according to the present invention.

FIG. 1 is a block diagram illustrating a specific embodiment of a system for changing channels for guaranteed reliability communication according to the present invention.

As shown in FIG. 1, the system for changing channels for guaranteed reliability communication according to the present invention includes a transmitting peer 10, a relay server 20, and a receiving peer 30.

The transmitting peer 10 divides data to be transmitted into frames and transmits the frames to a data destination terminal (i.e., the receiving peer 30). The transmitting peer 10 also generates an unfinished frame list, which is a list of the frames produced through division of the data to be transmitted, and updates the unfinished frame list according to received response frames and determines frames to be transmitted according to the updated unfinished frame list.

Here, the transmitting peer 10 transmits data frames of the unfinished frame list to the receiving peer 30, receives response frames from the receiving peer 30, and updates the unfinished frame list by deleting frames corresponding to the response frames from the unfinished frame list at specific time intervals.

In the case where the transmitting peer 10 performs relay channel communication with the receiving peer 30, the relay server 20 transfers a data frame transmitted by the transmitting peer 10 to the receiving peer 30.

The receiving peer 30 receives a data frame transmitted from the relay server 20 or from the transmitting peer 10. In the case where the data frame has been transmitted using a direct channel communication scheme, the receiving peer 30 transmits a response frame to the transmitting peer 10 in response to the received data frame.

The transmitting peer 10 and the receiving peer 30 can perform data communication with each other through a direct channel communication scheme and a relay channel communication scheme as described above.

In the case where the transmitting peer 10 and the receiving peer 30 perform data communication through the direct channel communication scheme, the two terminals perform communication using a User Datagram Protocol (UDP).

On the other hand, in the case where the transmitting peer 10 and the receiving peer 30 perform data communication through the relay channel communication scheme, the two terminals perform communication using Transmission Control Protocol (TCP).

A specific embodiment of a method for changing channels for guaranteed reliability communication according to the present invention will now be described in detail with reference to the accompanying drawings.

Figure 2:
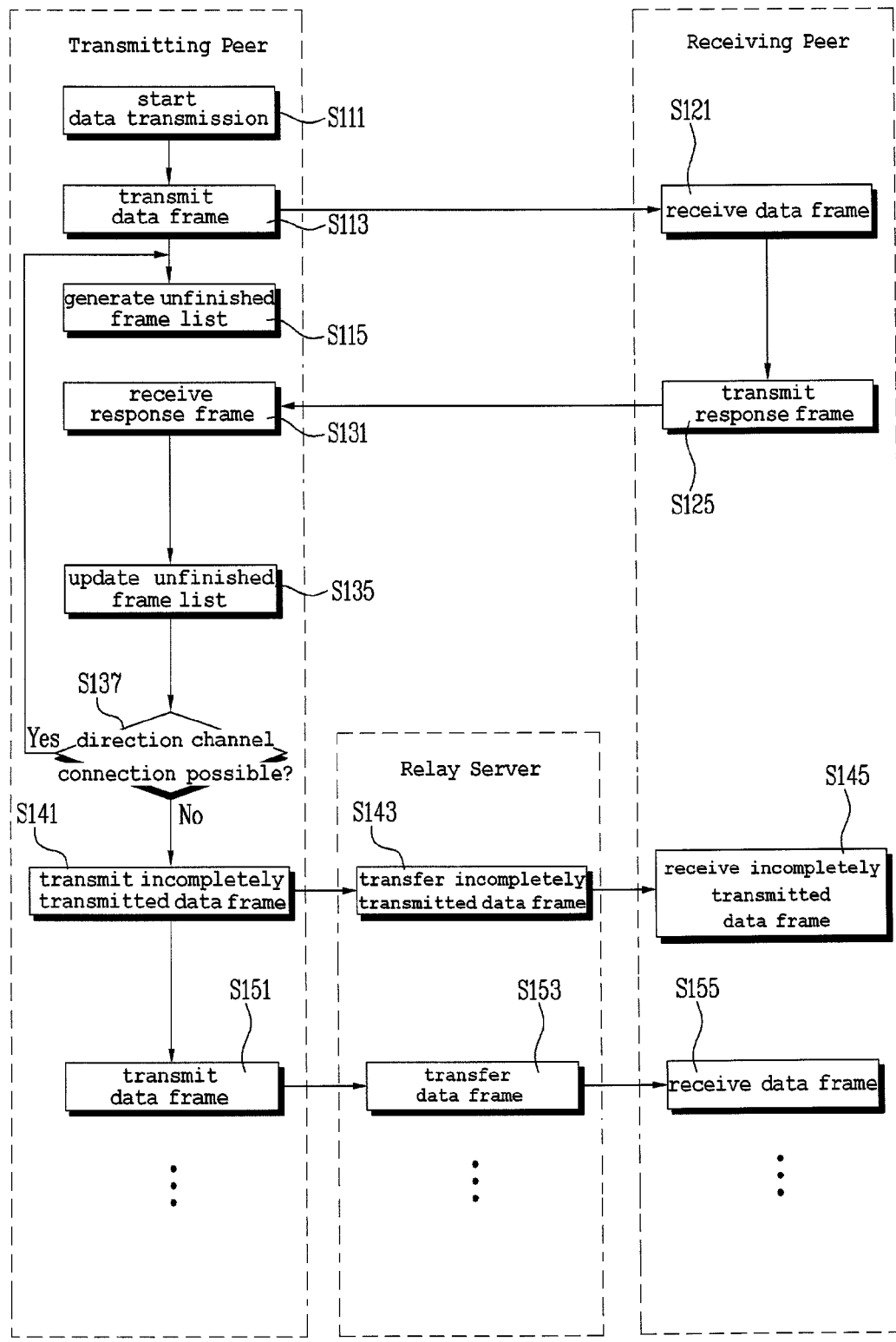
FIG. 2 is a flow chart illustrating a specific embodiment of a method for changing channels for guaranteed reliability communication according to the present invention.

FIG. 2 is a flow chart illustrating the specific embodiment of the method for changing channels for guaranteed reliability communication according to the present invention.

The specific embodiment of the method for changing channels for guaranteed reliability communication according to the present invention is described below with reference to the case where a channel communication scheme is changed to a relay channel communication scheme while direct channel communication is being performed as shown in FIG. 2.

That is, as shown in FIG. 2, while the transmitting peer 10 and the receiving peer 30 are performing data communication through the direct channel communication scheme (S111), the transmitting peer 10 generates an unfinished frame list including data frames to be transmitted (S113).

Thereafter, the transmitting peer 10 substantially sequentially transmits the frames included in the unfinished frame list to the receiving peer 30 (S115).

Upon receiving the frame, the receiving peer 30 transmits a response frame to the transmitting peer 10 in response to the received frame (S125).

The transmitting peer 10 updates the unfinished frame list according to the received response frame at time intervals of a preset period (S135, S137).

Specifically, the transmitting peer 30 checks a delay time at regular intervals and deletes frames corresponding to the response frames from the unfinished frame list when the delay time has exceeded the preset time.

Thereafter, the transmitting peer 10 repeats steps S115 to S137 until all frames to be transmitted are completely transmitted while checking whether or not a direct channel connection with the receiving peer 30 is effective (S139).

When direct channel communication between the transmitting peer 10 and the receiving peer 30 is not possible, the transmitting peer 10 immediately transmits incompletely transmitted data frames to the receiving peer 30 through the relay server 20 using the unfinished frame list updated at step S137 (S141, S143, S145).

Here, the term "incompletely transmitted data frames" refers to data frames whose response frames have not been received by the transmitting peer after being transmitted from the transmitting peer to the receiving peer.

Thereafter, the transmitting peer 10 transmits data frames to the receiving peer 30 through the relay channel communication scheme, i.e., through the relay server 20 (S151, S153, S155).

When the receiving peer 30 has received a data frame through the relay channel communication scheme, the receiving peer 30 does not transmit a response frame to the receiving peer 30.

As is apparent from the above description, the system and method for changing channels for guaranteed reliability communication according to the present invention has a variety of advantages.

For example, it is possible to perform reliable data communication without communication interruption when a communication channel is changed to a direct channel or a relay channel according to a channel setting environment.

In addition, when a communication scheme is changed as circumstances require, specifically, when the communication scheme is changed from a direct channel communication scheme to a relay channel communication scheme, it is possible to rapidly change the communication channel without interruption of data communication.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for changing a communication channel for guaranteed reliability communication, the system comprising:

a transmitting peer dividing data into data frames to be transmitted and generating an unfinished frame list that is a list of the data frames produced through the division of the data to be transmitted;

a receiving peer receiving the data frames transmitted from the transmitting peer and transmitting a response frame to the transmitting peer in response to the data frames received from the transmitting peer during a direct channel communication; and a relay server relaying a relay channel communication between the transmitting peer and the receiving peer, wherein the transmitting peer, when a preset time is reached, updates the unfinished frame list upon receiving the response frame from the receiving peer, wherein the transmitting peer immediately retransmits incompletely transmitted data frames included in the unfinished frame list to the receiving peer through the relay server when the communication channel is changed from the direct channel communication to the relay channel communication, wherein the updated unfinished frame list is a list of the data frames produced through the division of the data to be transmitted and the incompletely transmitted data frames, and wherein the incompletely transmitted data frames are data frames whose response frames have not been received by the transmitting peer after being transmitted from the transmitting peer to the receiving peer.

2. The system according to claim 1, wherein the transmitting peer and the receiving peer perform data communication using a User Datagram Protocol (UDP) during the direct channel communication.

3. The system according to claim 2, wherein the transmitting peer and the receiving peer perform data communication using a Transmission Control Protocol (TCP) during the relay channel communication.

4. A method for changing a communication channel for guaranteed reliability communication in a system including a transmitting peer, a receiving peer, and a relay server, wherein the communication channel is changed from a direct channel communication to a relay channel communication between the transmitting peer and the receiving peer, the method comprising:

by the transmitting peer, dividing data into multiple data frames to be transmitted and generating an unfinished frame list that is a list of the data frames produced through the division of the data to be transmitted;

by the transmitting peer, establishing the direct channel communication with the receiving peer and transmitting the data frames to the receiving peer;

by the receiving peer, transmitting a response frame to the transmitting peer in response to the data frame received from the transmitting peer during the direction channel communication;

by the transmitting peer, when a preset time is reached, updating the unfinished frame list according to the response frame at time intervals of a preset period; and by the transmitting peer, retransmitting immediately incompletely transmitted data frames included in the updated unfinished frame list to the receiving peer through the relay server when the communication channel is changed from the direct channel communication to the relay channel communication between the transmitting peer and the receiving peer, wherein the updated unfinished frame list is a list of the data frames produced through the division of the data to be transmitted and the incompletely transmitted data frames, and wherein the incompletely transmitted data frames are data frames whose response frames have not been received by the transmitting peer after being transmitted from the transmitting peer to the receiving peer.

5. The method according to claim 4, wherein the transmitting peer and the receiving peer perform data communication using a User Datagram Protocol (UDP) during the direct channel communication.

6. The method according to claim 5, wherein the transmitting peer and the receiving peer perform data communication using a Transmission Control Protocol (TCP) during relay channel communication.

* * * * *